Jan. 15, 1957  J. T. MAYNARD  2,777,962
DYNAMOELECTRIC MACHINE CONSTRUCTION
Filed April 4, 1955
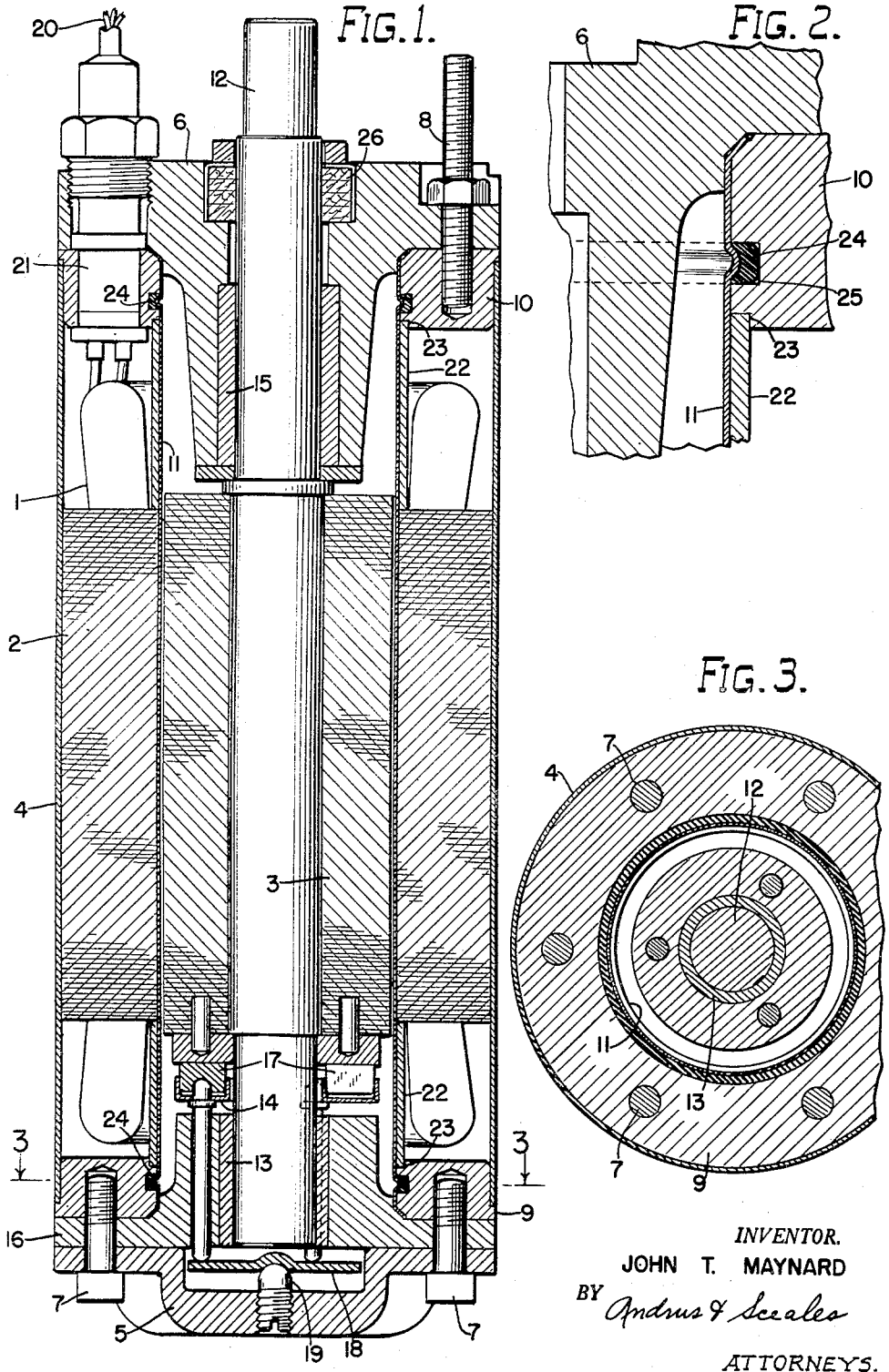
INVENTOR.
JOHN T. MAYNARD
BY *Andrus & Scales*
ATTORNEYS.

United States Patent Office 2,777,962
Patented Jan. 15, 1957

2,777,962

DYNAMOELECTRIC MACHINE CONSTRUCTION

John T. Maynard, West Allis, Wis., assignor to A. O. Smith Corporation, Milwaukee, Wis., a corporation of New York Application April 4, 1955, Serial No. 498,924

4 Claims. (Cl. 310—86)

This invention relates to dynamoelectric machines and particularly to dynamoelectric machines having separate rotor and stator chambers.

In many dynamoelectric machine applications, it is necessary to seal off the winding which is supported on the annular core member. This is generally accomplished by securing a foil-like cylindrical liner, formed of metal, to the interior core wall. Because the liner extends through the air gap between the machine core members, it is necessarily very thin.

The securement of the foil-like liner, in the past, was generally accomplished by soldering or brazing the end of the liner to the core member. The past structures have also employed a stuffing box. The stuffing box requires an added annular support adjacent each end of the liner with the packing and liner disposed between it and the annular core member.

In accordance with the present invention, the stator chamber is sealed by expanding a liner into recesses into end covers on plates at opposite sides of the stator core. A compressible sealing material is disposed within each recess such that a fluid-tight joint is formed when the liner is expanded into place.

An object of the present invention is to provide a simple and efficient seal for a motor liner.

Another object is to hold a metal liner securely in place within a stator core without the use of solder or the like.

The drawing furnished herewith illustrates the best mode presently contemplated for carrying out the invention.

In the drawing:

Figure 1 is a cross-sectional view of a submersible motor employing a liner;

Fig. 2 is an enlarged view of the seal between the liner and the housing for the stator as shown in Figure 1; and Fig. 3 is a view taken on line 3—3 of Figure 1.

Referring to the drawing and particularly Figure 1, a deep well submersible motor is shown which is adapted to be connected to a water pump, not shown, and vertically lowered into a well. The conventional submersible motor is an alternating current induction motor having the stator windings 1 carried on an annular or tubular stator core 2 and a squirrel cage cylindrical rotor 3 supported therein.

The stator core 2 is secured to an outer shell or casing 4 which is formed of stainless steel or other corrosion resistant material. The ends of the casing 4 are closed by end heads 5 and 6 which are bolted, as by the respective bolts 7 and 8, to the respective annular end plates 9 and 10. The end plates 9 and 10 are secured to the casing 4, in longitudinally spaced relation to the stator 2 to provide a stator chamber. The stator chamber thus formed is sealed by a foil-like liner 11, more fully described hereinafter.

The rotor 3 is carried by the rotor shaft 12 which is supported by radial and thrust bearings 13 and 14, respectively, in the lower or rearward end of the casing and by radial bearing 15 in the upper or forward end of the casing. The radial bearing 13 is provided with a radially extending flange 16 which extends between the head 5 and end plate 9. When the head 5 is bolted to the end plate 9, the radial bearing 13 is securely clamped in place. The opposite radial bearing 15 is formed integrally with the head 6.

The thrust bearing 14 is of the Kingsbury variety having a plurality of shoes 17. The thrust force on the shoes 17 is transmitted to an equalizer plate 18 which is centrally pivoted on hemispherical projection 19 extending from the head 5.

The power lead 20, which supplies current to the stator winding 1, passes through a suitable fluid-tight connection 21 in the upper head 6 to the winding 1.

As previously noted, the foil-like liner 11 seals off the chamber surrounding the stator core 2 and winding 1. The liner 11 is formed of a corrosion resistant metal, such as stainless steel, so as to allow contact with the well liquid without damage thereto.

The liner 11 which is not entirely self-supporting is supported, or backed by the stator core 2, the spaced end plates 9 and 10 and a pair of inner cylindrical rings 22 which respectively at each end of core 2 bridge the gap between the stator core 2 and the end plates. Rings 22 are placed within alignment notches 23 provided in the respective end plates 9 and 10. The face of rings 22 are radially aligned with the liner backing faces of the end plates and the stator core to provide a cylindrical opening receiving the rotor 3.

The end plates 9 and 10 are each provided with an O-ring seal 24 which is carried in annular recesses 25 on the backing face of the respective end plates. The liner 11 is expanded into the recess 25 of plates 9 and 10 at the opposite sides of the stator core to compress the O-ring seals and thereby form a fluid-tight joint, as more clearly shown in Fig. 2.

In assembly, the wound core 2 and end plates 9 and 10 are brazed to the outer casing 4. The backing rings 22 are then secured to the respective plates 9 and 10, and the O-ring seals 24 are placed in the recesses 25. Thereafter, the liner 11 is inserted and expanded radially outward throughout its entire length.

A suitable means for expanding the liner 11 is a pneumatic balloon, not shown in the drawing. After the liner 11 is placed within the assembly, described previously, the pneumatic tube is inserted within the liner 11 and is blown up to transmit a radial expansion force to the liner 11. The liner 11 is then forced into intimate contact with the backing members and expands into the recesses 25. Upon expansion into the recesses 25, the O-ring seals 24 are compressed and seal the stator windings 1 from the surrounding environment and the liner 11 is held securely inside the stator core. If the conventional open slot stator core is employed, the liner 11 is expanded into the slot openings and is mechanically bonded or secured in place.

The O-ring seals 24 are formed of any pliable sealing material such as rubber which does not lose its sealing properties with time.

Generally, the stator chamber is filled with a material such as oil or plastic which acts as a heat carrier to remove the heat generated in the windings.

Because the rotor is not damaged by contact with the water, the rotor chamber is not sealed except to prevent entrance of dirt and the like. As shown, a simple felt seal 26 surrounding the motor shaft where it passes through the motor head is sufficient.

Various modes of carrying out the invention are contemplated as within the scope of the following claims particularly pointing out and distinctly claiming the subject matter which is regarded as the invention.

I claim:

1. In a dynamoelectric machine, a tubular core, a winding wound on said core and extending longitudinally from the core, a shell secured to the outer surface of the core and extending axially beyond each end of the core, end plates secured to the outer shell axially removed from the opposite ends of the core to form a chamber in conjunction with the core with the longitudinally extending winding disposed therein, a liner located inside the annular core and extending beyond the end of the core and over the inner surface of said end plates to close the inside of said chamber, a circumferential groove provided in each end plate facing the liner and a pliable sealing material disposed in each of said grooves between the liner and the end plates, the said liner being expanded to compress the sealing material and form a fluid-tight joint therebetween with said joint sealing off the winding and securing the liner securely in place.

2. In a dynamoelectric machine, an outer cylindrical shell, a pair of cylindrical end plates secured in fluid-tight relation one to each end of the shell with each of said plates having a circumferential recess therein, an annular core disposed within the chamber and secured to the outer cylindrical shell axially inwardly removed from the end plates to form a chamber in conjunction with the shell and end plates, a longitudinally extending winding wound on said core and exposed in said chamber, O-ring seals provided within each of said recesses, and a foil-like cylinder disposed within the annular core and extending axially over the inner surface of the end plates and across the recesses and O-rings, and said cylinder being expanded into said recesses to compress the O-rings and thereby fluid-tightly seal the cylindrical chamber and secure the cylinder in place.

3. In a submersible motor, a cylindrical casing of corrosion-resistant material, an annular magnetic core secured within said casing and having a longitudinally wound field winding within slots on its inner peripheral surface, a pair of end plates secured in fluid-tight relation one to each end of the casing and in longitudinal spaced relation to the magnetic core, backing rings extending between the end plates and the stator core and having the inner surfaces thereof generally axially aligned with the inner surfaces of the end plates and the core to form a cylindrical opening, and a thin tubular liner disposed within the opening and extending from a portion of one end plate to a portion of the opposite end plate, an annular recess in each of said end plates beneath the liner, and O-ring seals disposed within each of the recesses, and said liner being expanded outwardly into close contact with the end plates and the backing rings and the core surface adjacent the liner and into the recesses to compress the O-ring seals and thereby seal the field winding within a fluid-tight chamber.

4. In a submersible motor, a tube-like magnetic core having a plurality of longitudinal winding slots opening into the bore of the core, a distributed field winding placed in the winding slots, a tubular outer casing surrounding the core and winding with the core securely attached thereto, an annular end plate secured to each end of the casing and having a bore aligned with the bore of the core, a pair of backing rings secured to each end plate and extending from the end plate to the core, said rings having a backing surface aligned with the bores of the core and the end plates, an annular recess in the bore face of each end plate, an O-ring seal in each of said recesses, said O-ring seal being pliable and remaining pliable after a substantial period of time, and a thin foil-like corrosion resistant tubular liner disposed within the bore of the core and the end plates and expanded radially outwardly into contact with the adjacent surfaces and into the annular recesses to compress the O-ring seals off the field winding from the surrounding atmosphere.

References Cited in the file of this patent

UNITED STATES PATENTS 2,698,911    Schaefer _____ Jan. 4, 1955

FOREIGN PATENTS 675,602    Great Britain _____ July 16, 1952